United States Patent
Ichikawa et al.

(10) Patent No.: US 7,225,519 B2
(45) Date of Patent: Jun. 5, 2007

(54) ASSEMBLING METHOD USING MARKED INFORMATION

(75) Inventors: Yukihito Ichikawa, Nagoya (JP); Eiji Ito, Yokkaichi (JP)

(73) Assignee: NGK Insulators, Ltd., Nagoya (JP)

( * ) Notice: Subject to any disclaimer, the term of this patent is extended or adjusted under 35 U.S.C. 154(b) by 340 days.

(21) Appl. No.: 10/169,935

(22) PCT Filed: Nov. 16, 2001

(86) PCT No.: PCT/JP01/10005

§ 371 (c)(1),
(2), (4) Date: Jul. 11, 2002

(87) PCT Pub. No.: WO02/40217

PCT Pub. Date: May 23, 2002

(65) Prior Publication Data

US 2003/0000060 A1    Jan. 2, 2003

(30) Foreign Application Priority Data

Nov. 17, 2000 (JP) .............................. 2000-351680

(51) Int. Cl.
*B23P 11/00* (2006.01)
(52) U.S. Cl. .................. 29/407.01; 29/428; 235/462.01
(58) Field of Classification Search ............. 29/407.01, 29/407.1, 428, 557, DIG. 16, DIG. 25; 235/462.01; 216/52, 100
See application file for complete search history.

(56) References Cited

U.S. PATENT DOCUMENTS

| | | | |
|---|---|---|---|
| 4,327,283 A * | 4/1982 | Heyman et al. ............ 235/487 |
| 4,374,451 A * | 2/1983 | Miller .......................... 445/22 |
| 4,416,632 A | 11/1983 | Berman ....................... 434/84 |
| 4,559,684 A * | 12/1985 | Pryor ...................... 29/888.06 |
| 4,571,078 A * | 2/1986 | Capps, II .................... 356/246 |
| 4,879,457 A * | 11/1989 | Ludden ...................... 235/487 |
| 5,369,870 A * | 12/1994 | Ouchi et al. .................. 29/558 |
| 5,425,286 A * | 6/1995 | Laue ........................... 74/560 |
| 5,755,025 A * | 5/1998 | Wirth et al. .................. 29/840 |
| 6,006,817 A | 12/1999 | Stone et al. ................ 160/201 |
| 6,259,056 B1 * | 7/2001 | Cowden ................ 219/121.69 |

FOREIGN PATENT DOCUMENTS

| | | |
|---|---|---|
| EP | 0 317 539 | 5/1989 |
| EP | 317539 A2 * | 5/1989 |
| GB | 2134688 A * | 8/1984 |
| JP | 11-258013 | 9/1999 |

* cited by examiner

Primary Examiner—Jermie E. Cozart
(74) Attorney, Agent, or Firm—Steptoe & Johnson LLP

(57) ABSTRACT

An assembling method for assembling an assembly by combining a plurality of mating members with each other, wherein inherent information regarding dimensions of individual members, which is necessary for the combination of members, has been marked on the member surface prior to the start of an assembling process, the information marked on the member is read in the assembling process, and members having a dimension that meets a proper combining condition are selected based on the information. An individual member and inherent information regarding the dimension of members can be handled integrally, when the mating members are combined with each other, members having a dimension that meets a proper combining condition are selected, and when the member is processed so as to correspond to the property thereof, proper processing corresponding to the inherent properties of each member can be performed easily and surely without troublesome work.

17 Claims, 4 Drawing Sheets

ASSEMBLING METHOD USING MARKED INFORMATION

TECHNICAL FIELD

The present invention relates to an assembling method for industrial members using information regarding inherent properties of individual members and a processing method for the member itself.

BACKGROUND ART

In the industrial field, the assembling of mating members has a wide variety of applications. A typical example thereof is mechanical parts requiring a fit such as a clearance fit or an interference fit. As an example of clearance fit, there can be cited many examples including upper and lower punches and a sleeve in a press molding die, which is an assembly in which the members can be moved relatively, a rolling element and inner and outer rings in a rolling bearing, a piston and a cylinder liner in an internal combustion engine, and a piston pin and a piston and a connecting rod.

Also, as an assembly in which members requiring a fit such as a transition fit or an interference fit cannot be moved relatively, there can be cited fixing of a boss to a rim in a gear, fitting of a bearing bush in a housing, and fastening of a ceramic rotor shaft portion to a metallic shaft in a ceramic gas turbine rotor. In the case where such members are connected, the relative dimensions in the connecting portion is important.

The shape dimension of a member distributes with a variation. In fitting, in order to meet a proper fitting condition, the variations in shape dimension of member are decreased by machining, that is, a member is machined so as to have high accuracy. However, in some cases, sufficient machining accuracy cannot be secured, or machining cannot be performed. In such cases, conventionally, a method has been used in which the shape dimension of member is measured individually, and members are classified according to dimension range based on the measurement result to form some dimension range lots.

After the mating members are classified into some dimension range lots as described above, proper mating dimension range lots are selected, and members in each lot are used to make assembly. Sometimes, the dimension range lot classification is made for both members. Sometimes, the classification is made for only a member having relatively large variations because it cannot have sufficient machining accuracy or cannot be machined, and the shape dimension of the mating member is matched to a typical dimension of the dimension range lot.

In this method, however, since the influence of dimensional variations in a dimension range lot cannot be averted, it cannot be said that a sufficiently proper fitting condition can be realized. Therefore, a method has been thought in which based on the dimensional data inherent in individual member, processing is performed such that the mating members are machined individually so as to have a dimension that meets a proper fitting condition, or members having such a dimension are selected, by which a combination having a proper fitting condition is realized.

Conventionally as well, for example, a method has been used in which the dimensional data of individual members are entered on a measurement recording sheet, a number or any identification symbol is put on the members, and based on the dimensional data on the recording sheet, the mating members are subjected to the aforementioned processing.

However, in the method in which the dimensional data of individual members are entered on a measurement recording sheet minutely to control the members as described above, as the number of members increases, the work for entering data on the recording sheet becomes troublesome, and also the work for reading the data on the recording sheet becomes troublesome, which poses a problem in that not only enormously much time is required for the entering and reading work but also errors in entering and reading occur frequently.

The error in reading is thought to be basically caused by the fact that the member itself and the data are handled separately. Especially when a large quantity of members are moved to a place distant from the place where the members have been processed and are combined with the mating member, the member and information are transferred with a message not being delivered satisfactorily from worker to worker, which makes the problem more remarkable.

The present invention has been made in view of the above situation, and accordingly an object thereof is to provide a method in which an individual member and inherent information regarding the dimension etc. of the member can be handled integrally, when the mating members are combined with each other, members having a dimension that meets a proper combining condition are selected, and when the member is processed so as to correspond to the property thereof, proper processing corresponding to the inherent property of each member can be performed easily and surely without troublesome work.

DISCLOSURE OF THE INVENTION

According to the present invention, there is provided an assembling method for assembling an assembly by combining a plurality of mating members with each other, characterized by marking an inherent information regarding the dimensions of individual members, which is necessary for the combination of the members, on the member surface prior to the start of an assembling process, reading the information marked on the member in the assembling process, and selecting members having a dimension that meets a proper combining condition based on the information (a first aspect of the present invention).

According to the present invention, there is provided an assembling method for assembling an assembly by combining a plurality of mating members with each other, characterized by marking inherent information regarding the dimensions of individual members, which is necessary for the combination of the members, on the member surface prior to the start of an assembling process, reading the information marked on the member in the assembling process, and selecting members having a dimension that meets a proper combining condition based on the information (a first aspect of the present invention).

Further, according to the present invention, there is provided an assembly which is assembled by either of the above-described assembling methods (a third aspect of the present invention).

Further, according to the present invention, there is provided a member on which the information used in either of the above-described assembling methods is marked (a fourth aspect of the present invention).

Further, according to the present invention, there is provided a processing method for processing a plurality of members so as to correspond to the property of the member, characterized by marking an information regarding the inherent properties of individual members on the member surface prior to the start of the processing process, reading the information marked in the processing process, processing the member so as to correspond to the inherent property of the member based on the information (a fifth aspect of the present invention).

Further, according to the present invention, there is provided a member processed by either of the above-described processing methods (a sixth aspect of the present invention).

Further, according to the present invention, there is provided a member on which the information by which processing is performed by either of the above-described processing methods is marked (a seventh aspect of the present invention).

BEST MODE FOR CARRYING OUT THE INVENTION

Figure 1:
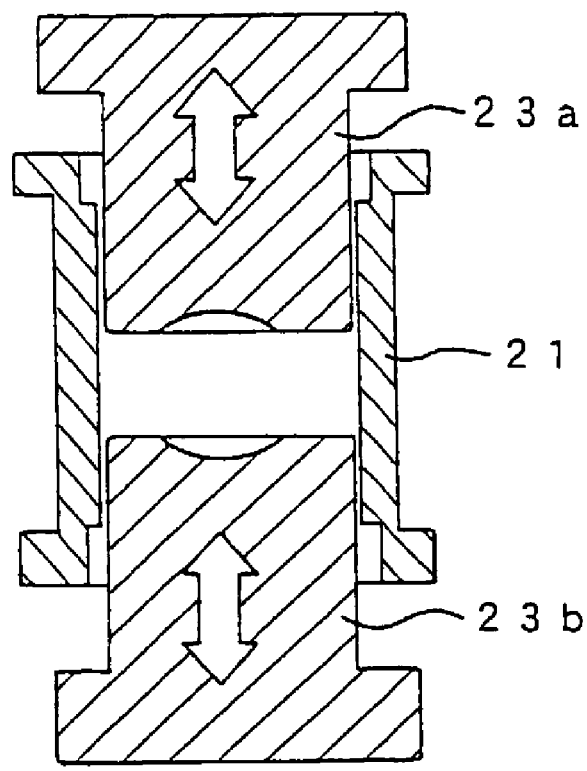
FIG. 1 is a sectional view showing a construction of a press die.

As described above, a first aspect of the present invention is characterized by in that in an assembling method for assembling an assembly by combining a plurality of mating members with each other, inherent information regarding the dimensions of individual members, which is necessary for combination of these members, has been marked on the member surface prior to the start of the assembling process, and in the assembling process, the information marked on the member is read, and members having a dimension that meets a proper combining condition are selected based on the information.

As described above, the inherent information regarding the dimension of member is marked on the surface of the member, by which an individual member and inherent information regarding the dimension of the member can be handled integrally. Therefore, when the mating members are combined with each other, the members having a dimension that meets a proper combining condition can be selected easily and surely.

A second aspect of the present invention is characterized in that in an assembling method for assembling a similar assembly, inherent information regarding the dimensions of individual members, which is necessary for combination of these members, has been marked on the surface of one member prior to the start of the assembling process, and in the assembling process, the information marked on the member is read, and the other member is manufactured so as to meet a proper combining condition based on the information and is combined with the one member.

As described above, based on the inherent information regarding the dimension of individual member marked on the surface of one member, the other member having a proper dimension corresponding to the dimension of the one member is manufactured and is combined with the one member, by which an assembly in which the members are combined in a proper condition can be manufactured easily.

The first and second aspects of the present invention can be applied suitably to the assembling of an assembly requiring fitting of a plurality of mating members. Also, in the first and second aspects of the present invention, characters or a bar code can be used as the marking format of information. Also, the information can be marked by ink application, laser, sandblasting, chemical corroding action, or the like. When the information is marked by ink, the ink jet method or the thermal transfer method is preferably used.

A third aspect of the present invention provides an assembly which is assembled by the method in accordance with the first or second aspect of the present invention. Since the members having a dimension that meets a proper combining condition are assembled as described above, the assembly can be used suitably in a variety of applications. A fourth aspect of the present invention provides a member before being assembled on which the information used in the method in accordance with the first or second aspect of the present invention is marked. The information is marked in advance with various formats and means as described above, and the assembling method in accordance with the first or second aspect of the present invention is carried out based on the information.

A fifth aspect of the present invention is characterized in that in a method for processing a plurality of members so as to correspond to the property of the member, information regarding the inherent properties of individual members has been marked on the member surface prior to the start of the processing process, and in the processing process, the information is read, and the member is processed so as to correspond to the inherent property of the member based on the information.

As described above, the information regarding the inherent property of individual member is marked on the surface of the member in advance, by which an individual member and the inherent information regarding the property of the member can be handled integrally, so that proper processing corresponding to the property of the member can be performed easily and surely.

As the marking format and marking means of information in the fifth aspect of the present invention, the same format and means as those in the first and second aspects of the present invention can be used.

A sixth aspect of the present invention provides a member processed by the method in accordance with the fifth aspect of the present invention. As described above, proper processing corresponding to the inherent property of the member is performed easily and surely. Also, a seventh aspect of the present invention provides a member before being processed on which the information by which processing is performed by the method in accordance with the fifth aspect of the present invention is marked. The information is marked in advance by various formats and means as described above, and the processing method in accordance with the fifth aspect of the present invention is carried out based on the information. Although the material of the member is not subject to any special restriction, a member formed of, for example, ceramics is suitably used.

Hereunder, the present invention will be described in more detail with reference to examples, and the present invention is not limited to these examples.

EXAMPLE 1

As a specific example of the assembling method in accordance with the present invention, an assembling method for a sleeve and upper and lower punches in a press die is explained. A press die as shown in FIG. 1 has been used widely in the industrial field. A function is required such that upper and lower punches 23a and 23b slide smoothly in a sleeve 21 without leakage of a press material from the die under a pressing condition. Therefore, the inside diameter of the sleeve 21 and the outside diameters of the upper and lower punches 23a and 23b are required to have close fitting accuracy for providing a clearance of several microns suitable for sliding and to have surface roughness suitable for sliding. As a material of press die, a stainless steel material, a cemented carbide material, or a ceramic material is used. Generally, the inside diameter of sleeve is machined by an internal cylindrical grinding machine, and on the other hand, the upper and lower punches are machined by an external cylindrical machine.

Figure 2:
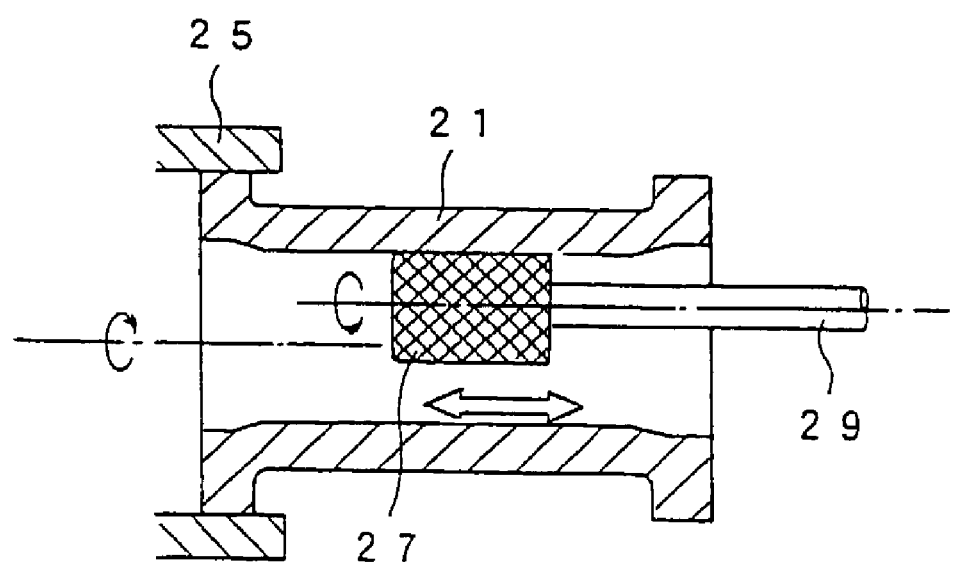
FIG. 2 is an explanatory view showing a method for grinding the inner peripheral surface of a sleeve of a press die.

In the case where the sleeve 21 is fixed to a rotatable chuck 25, and the inner peripheral surface of the sleeve 21 is machined by an internal cylindrical grinding machine while the sleeve 21 and a grindstone shaft 29 are rotated in the direction opposite to each other as shown in FIG. 2, the machining condition becomes severe and a grindstone 27 wears heavily due to a small diameter of the grindstone 27, and the grindstone is moved away by a machining force due to a low stiffness of the grindstone shaft 29, so that it is very difficult to enhance the machining accuracy. In the case where the sleeve 21 is formed of a harder material such as cemented carbide or a ceramic material represented by silicon nitride and silicon carbide, the difficulty in machining the sleeve 21 with high accuracy increases.

Figure 3:
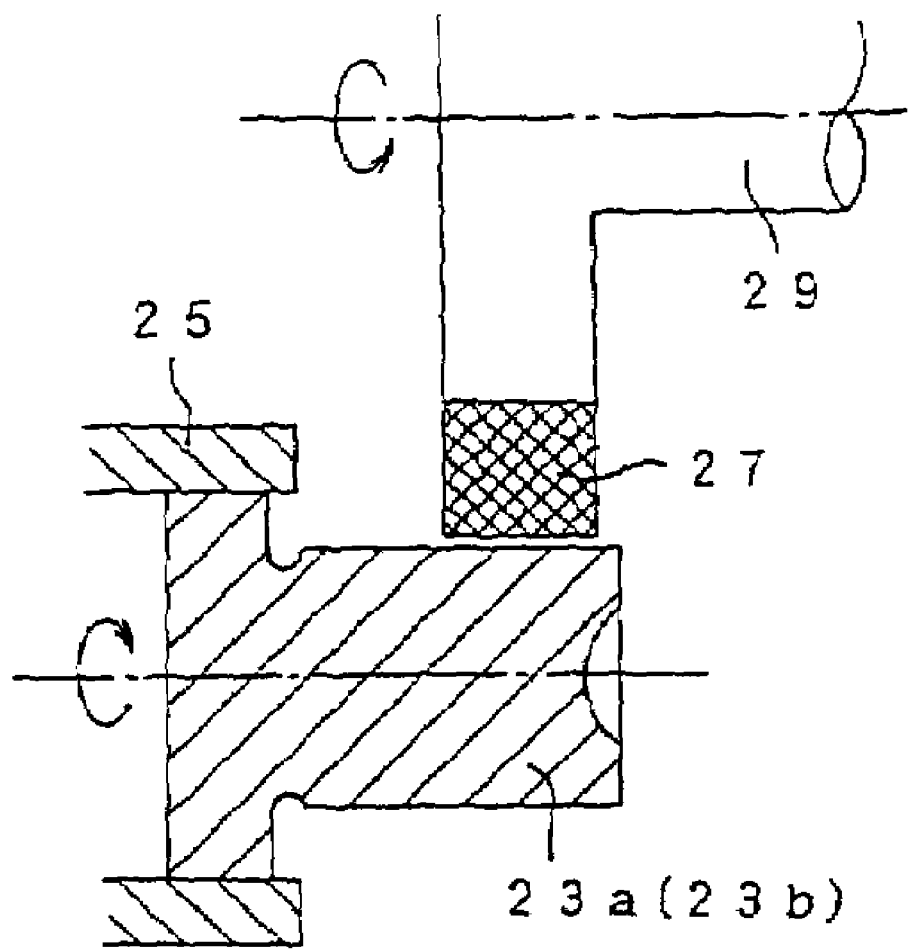
FIG. 3 is an explanatory view showing a method for grinding the outer peripheral surface of upper and lower punches of a press die.

On the other hand, in the case where the upper and lower punches 23a and 23b are fixed to the rotatable chuck 25, and the outer peripheral surface of the upper and lower punches 23a and 23b are machined by an external cylindrical grinding machine while the sleeve 21 and the grindstone shaft 29 are rotated in the direction opposite to each other as shown in FIG. 3, the diameter of the grindstone 27 can be increased, so that the grindstone wear is relatively low, and the stiffness of grindstone shaft is relatively high. Therefore, machining can be performed with high accuracy.

Also, it is difficult to measure the machined dimension with high accuracy at the time of machining due to the temperature condition of the workpiece and measurement environment. Therefore, the workpiece must once be carried into an inspection room having a favorable environment for measurement. In particular, the measurement of inside-diameter dimension of the sleeve is very difficult to make as compared with the measurement of outside-diameters of the upper and lower punches. For these reasons, it is very difficult to obtain a press die having a proper fitting combination.

To overcome the above-described problems, the inside diameter of sleeve whose inner peripheral surface has been finish machined in advance was measured by a three-dimensional measuring instrument or a cylindrical gage in an inspection room, and the inside-diameter dimension information was marked with a bar code on the external surface of the sleeve. Next, in a machining room, the bar-code information marked on the external surface of sleeve was read, and the outside diameters of the upper and lower punches were machined based on the information. Thereby, a combination of the sleeve and the upper and lower punches having a proper clearance therebetween could be obtained, and additionally, since the outside diameters of the upper and lower punches were machined so as to match the inside diameter of the sleeve, allowance was provided for the allowable range of machined inside-diameter dimension of the sleeve, and thus the dimensional control in machining the inside diameter of sleeve was made easy to carry out.

EXAMPLE 2

Figure 4A:
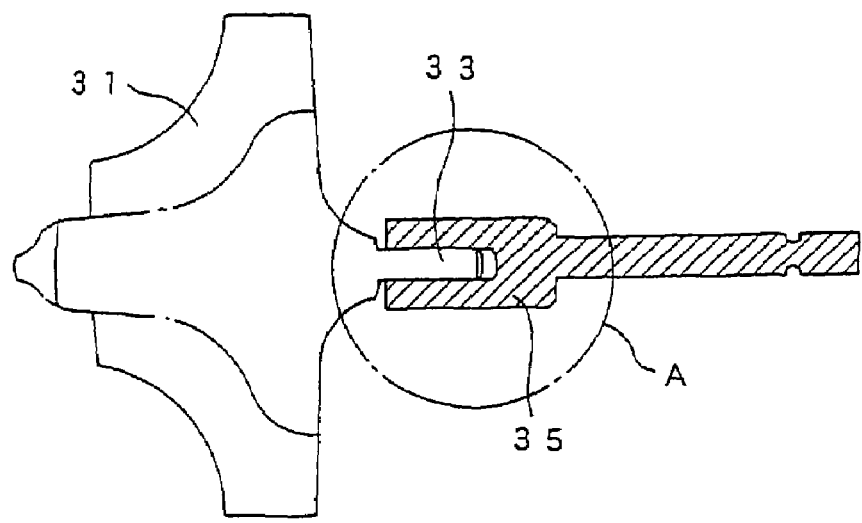
FIGS. 4(a) and 4(b) are explanatory views showing a combined state of a ceramic rotor and a metallic shaft in a ceramic gas turbine rotor, FIG. 4(a) being a general view, and FIG. 4(b) being an enlarged view of portion A of FIG. 4(a).
Figure 4B:
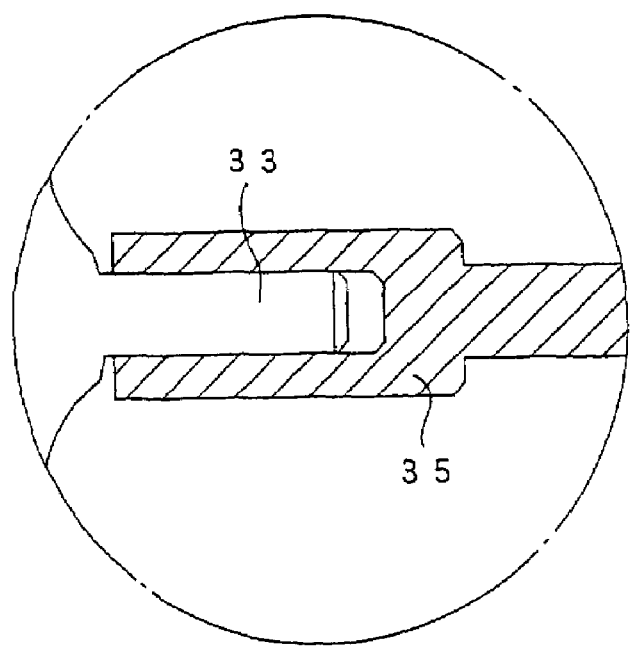

As another specific example of the assembling method in accordance with the present invention, an assembling method for a ceramic gas turbine rotor is explained. Although the relation between the sleeve and the upper and lower punches in the press die shown in Example 1 is a clearance fit, the same is true in the case of an interference fit. FIGS. 4(a) and 4(b) show a ceramic gas turbine rotor. In these figures, a ceramic rotor 31 subjected to high-temperature exhaust gas and a metallic shaft 35 are fastened by a shrinkage fit or a pressing method. As shown in FIGS. 4(a) and 4(b), a shaft 33 of the ceramic rotor 31 is pressed into a hole provided in the metallic shaft 35. In this case as well, the hole inside diameter of the metallic shaft and the shaft outside diameter of the rotor are required to have high accuracy, so that the same assembling method as that for the press die in Example 1 is effective.

Specifically, the hole inside diameter of the metallic shaft whose inner peripheral surface has been finish machined in advance was measured in an inspection room, and the inside-diameter dimension information was marked with a bar code on the external surface of the metallic shaft. Next, in a machining room, the bar-code information marked on the external surface of metallic shaft was read, and the outside diameter of the shaft of ceramic rotor was machined based on the information. Thereby, a combination of the ceramic rotor and the metallic shaft having a proper clearance therebetween could be obtained, and additionally, since the outside diameter of the shaft of ceramic rotor was machined so as to match the inside diameter of the hole of metallic shaft, allowance was provided for the allowable range of machined inside-diameter dimension of the hole of metallic shaft, and thus the dimensional control in machining the inside diameter of the hole was made easy to carry out.

EXAMPLE 3

Figure 5:
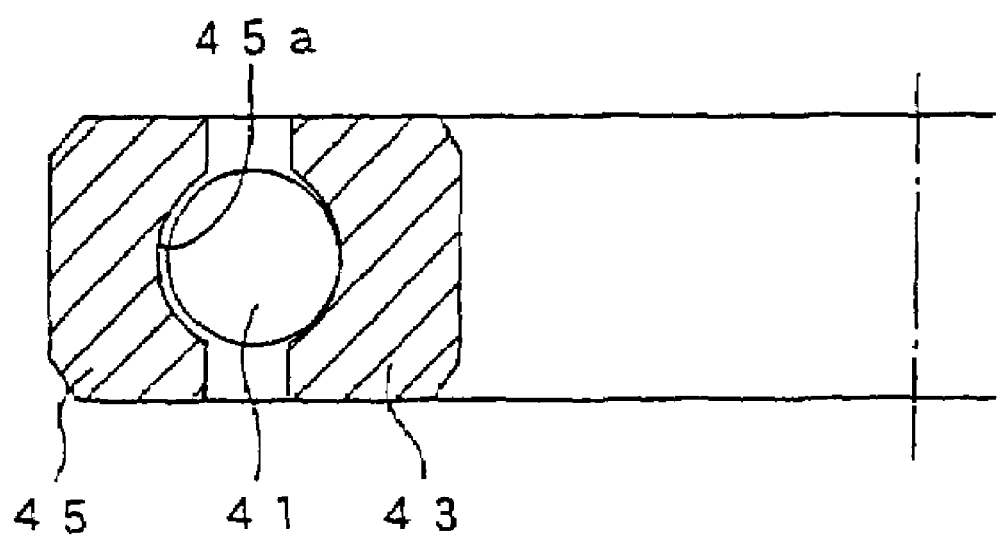
FIG. 5 is an explanatory view showing a combined state of inner and outer rings and a rolling element in a rolling bearing.

As still another specific example of the assembling method in accordance with the present invention, an assembling method for a rolling bearing is explained. In the relation between an inner ring 43, an outer ring 45, and a rolling element 41 in a rolling bearing shown in FIG. 5, since a groove 45a in the outer ring 45 is subjected to internal grinding, the same assembling method as that for the press die in Example 1 is effective.

Specifically, the inside diameter of the outer ring groove whose inner peripheral surface has been machine finished in advance was measured in an inspection room, and the inside-diameter dimension information was marked with a bar code on the external surface of the outer ring. Next, in a machining room, the bar code information marked on the external surface of outer ring was read, and the rolling element and the inner ring were machined based on the information. Thereby, a combination of the outer ring, inner ring, and rolling element having a proper fitting dimension could be obtained.

INDUSTRIAL APPLICABILITY

As described above, according to the present invention, an individual member and inherent information regarding the dimension etc. of the member can be handled integrally, when the mating members are combined with each other, members having a dimension that meets a proper combining condition are selected, and when the member is processed so as to correspond to the property thereof, proper processing corresponding to the inherent property of each member can be performed easily and surely without troublesome work.

The invention claimed is:

1. An assembling method, for an assembly by combining a plurality of mating members with each other, the method comprising:

marking a member surface with information specifying a dimension of the member;

reading the information specifying a dimension of individual members, wherein the information specifying a dimension is for a combination of said members, selecting members having a dimension that meets a proper combining condition based on said read information, and combining the selected members to form an assembly, wherein information regarding the dimensions of individual members, for a combination of said members, has been marked on the surface of one member in advance before an assembling process is started, and in the assembling process, said information marked on said member is read, and another member is manufactured to meet a proper combining condition based on the read information and is combined with said one member.

2. The assembling method according to claim 1, wherein a marking format of said information is characters.

3. The assembling method according to claim 1, wherein a marking format of said information is a bar code.

4. The assembling method according to claim 3, wherein said information is marked by ink.

5. The assembling method according to claim 4, wherein the method for marking said information by ink is an ink jet method or a thermal transfer method.

6. The assembling method according to claim 3, wherein said information is marked by a laser.

7. The assembling method according to claim 3, wherein said information is marked by sandblasting.

8. The assembling method according to claim 3, wherein said information is marked by chemical corroding action.

9. The assembling method according to claim 1, wherein said information is marked by ink.

10. The assembling method according to claim 9, wherein the method for marking said information by ink is an ink jet method or a thermal transfer method.

11. The assembling method according to claim 1, wherein said information is marked by a laser.

12. The assembling method according to claim 1, wherein said information is marked by sandblasting.

13. The assembling method according to claim 1, wherein said information is marked by chemical corroding action.

14. The assembly method according to claim 1, wherein the combined members form a press die.

15. The assembly method according to claim 1, wherein the combined members form a ceramic turbine rotor.

16. The assembly method according to claim 1, wherein the combined members form a rolling bearing.

17. The assembling method for assembling an assembly by combining a plurality of mating members with each other, the method comprising:

marking a member surface with information specifying a dimension of the member;

reading the information specifying a dimension of individual members, wherein the information specifying a dimension is for a combination of said members, selecting members having a dimension that meets a proper combining condition based on said read information, and combining the selected members to form an assembly, wherein information regarding the dimensions of individual members, for a combination of said members, has been marked on the surface of one member in advance before an assembling process is started, and in the assembling process, said information marked on said member is read, and another member is manufactured to meet a proper combining condition based on the read information and is combined with said one member, wherein combining the members includes fitting the members to each other with a transition fit or interference fit.

* * * * *